United States Patent [19]

Kawabata et al.

[11] 4,304,390

[45] Dec. 8, 1981

[54] PNEUMATIC PRESSURE RESPONSIVE VALVE ASSEMBLY

[75] Inventors: Yasuhiro Kawabata, Anjo; Yoshihiro Naruse, Kariya, both of Japan

[73] Assignee: Aisin Seiki Kabushiki Kaisha, Kariya, Japan

[21] Appl. No.: 100,559

[22] Filed: Dec. 5, 1979

Related U.S. Application Data

[63] Continuation of Ser. No. 877,665, Feb. 14, 1978, abandoned.

[30] Foreign Application Priority Data

Feb. 14, 1977 [JP] Japan .................................. 52-14767

[51] Int. Cl.³ .......................................... F16K 31/126
[52] U.S. Cl. ..................................... 251/61; 251/61.5;
137/DIG. 8; 92/98 D
[58] Field of Search ...................... 251/61, 31, 61.5;
123/119 A; 92/98 D; 137/DIG. 8

[56] References Cited

U.S. PATENT DOCUMENTS

| 2,905,199 | 9/1959 | Cook | 92/100 X |
| 3,689,025 | 9/1972 | Kiser | 137/DIG. 7 |
| 3,796,408 | 3/1974 | Sheppard | 251/61 X |
| 3,847,513 | 11/1974 | Foster | 92/98 D |
| 3,974,849 | 8/1976 | Dawson | 251/61 X |

FOREIGN PATENT DOCUMENTS

| 200455 | 12/1955 | Australia | 251/61 |
| 904005 | 8/1962 | United Kingdom | 92/98 D |

Primary Examiner—Arnold Rosenthal
Attorney, Agent, or Firm—Oblon, Fisher, Spivak, McClelland & Maier

[57] ABSTRACT

A pneumatic pressure responsive valve assembly includes a housing, a diaphragm piston including a diaphragm member and a piston member, the diaphragm member having an outer periphery secured to the housing and an inner periphery secured to the piston member, two pneumatic chambers defined by the diaphragm piston within the housing, one of the chambers selectively receiving both of the fluid pressures which are higher and lower than those within the other of the chambers, the diaphragm member having a curvature which expands towards either of the chambers, an expanding portion formed on either of the housing or the piston member and corresponding to the configuration of the curvature of the diaphragm member to thereby prevent the curvature of the diaphragm member from turning over, and a valve member for cooperation with movement of the piston member.

2 Claims, 5 Drawing Figures

PNEUMATIC PRESSURE RESPONSIVE VALVE ASSEMBLY

This is a continuation of application Ser. No. 877,665, filed Feb. 14, 1978, now abandoned.

BACKGROUND OF THE INVENTION

1. Field of the Invention

The present invention relates to a valve assembly and more particularly to a pneumatic pressure responsive valve assembly utilizing a diaphragm means movable in response to a difference in pressure between two pneumatic chambers.

2. Description of the Prior Art

Various systems and devices have recently been proposed for emission control for vehicles in which valve assemblies responsive to a vacuum signal generated at a carburetor are incorporated. In a particular prior system, the valve assembly includes an annular diaphragm an outer periphery of which is secured to and held by the housing to thereby define two pneumatic chambers and a piston secured to the diaphragm to thereby cause a valve member to operate. The diaphragm is adapted to be moved in response to the difference in pressure between two chambers. More particularly, under one condition of engine operation, the pneumatic pressure which is higher than that within another chamber is transmitted to one chamber, while under another condition the pneumatic pressure which is less than that within another chamber is transmitted to one chamber. Therefore, the central portion of the diaphragm subjected to pneumatic pressures within both chambers at both sides thereof is urged so as to be curved towards one chamber under one condition, and is urged so as to be curved towards another chamber under another condition. In other words, the central portion of the diaphragm is cyclically urged so as to change its curvature. This decreases the durability of the diaphragm.

SUMMARY OF THE INVENTION

It is, therefore, an object of the present invention to provide an improved pneumatic pressure responsive valve assembly which obviates the abovementioned prior drawback.

It is another object of the present invention to provide an improved pneumatic pressure responsive valve assembly which is high in durability.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
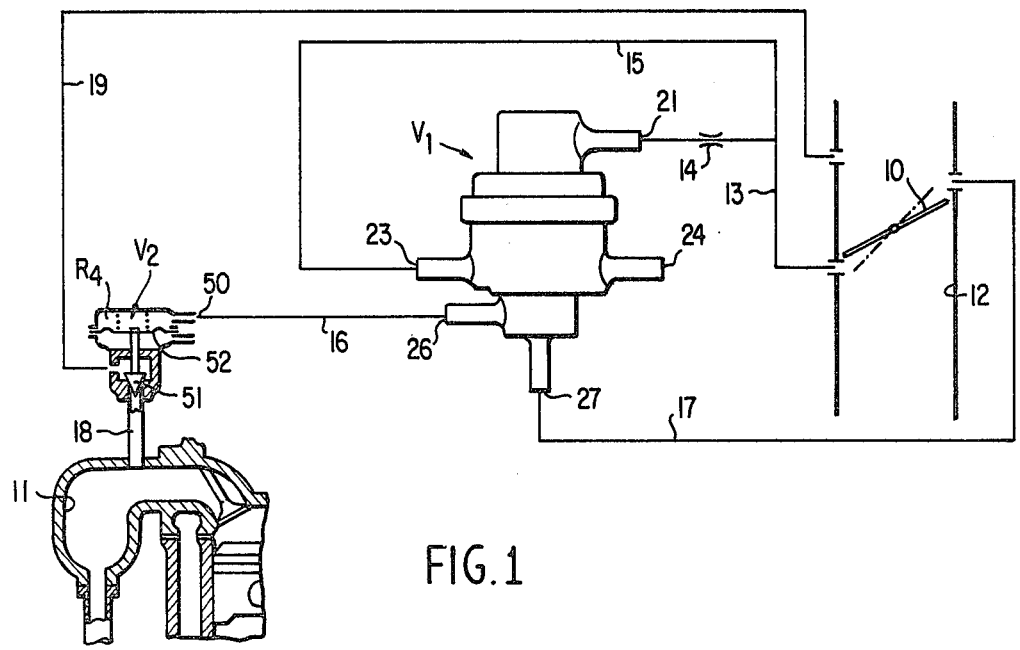
FIG. 1 is a schematic view illustrating an exhaust gas recirculation system in which a pneumatic pressure responsive valve assembly according to the present invention is incorporated.
Figure 2:
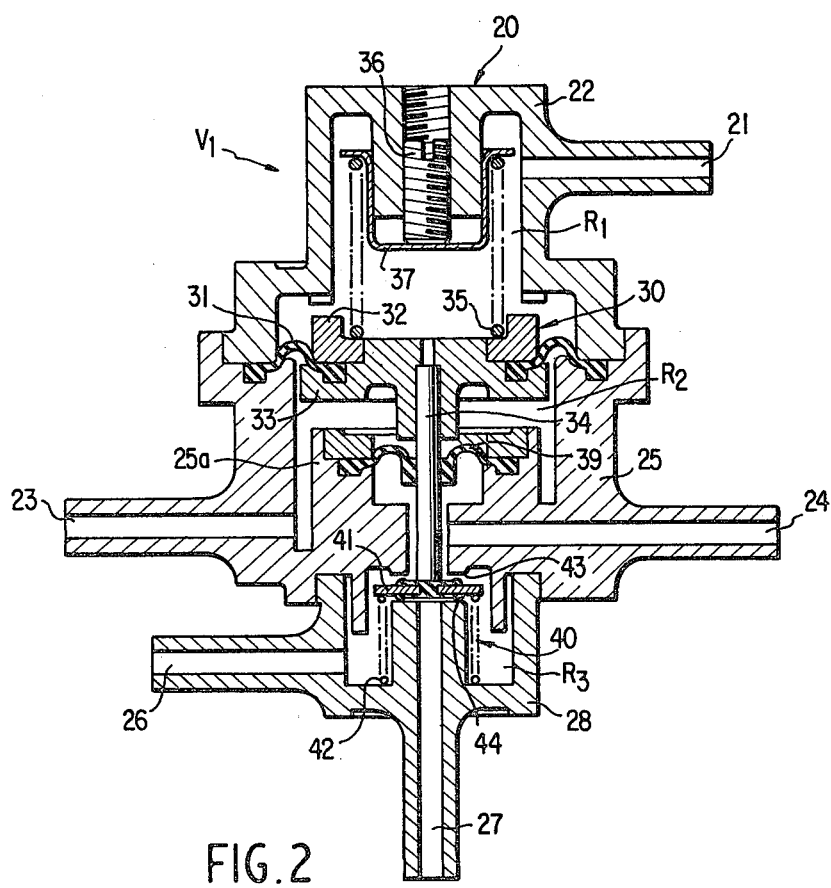
FIG. 2 is an enlarged cross-sectional view of the pneumatic pressure valve assembly of FIG. 1.

In FIGS. 1, and 2, a pneumatic pressure responsive valve assembly $V_1$ according to the present invention is incorporated within, for example, an exhaust gas recirculation system.

The valve assembly $V_1$ includes a housing body 20, a diaphragm piston means 30 within the body 20, a second diaphragm 39 and a change-over valve means 40. The body 20 has a first housing 22 having a first port 21 which is connected to a port exposed to an intake manifold 12 through a passage 13 and an orifice 14 when a throttle valve 10 is in its idling condition. The body 20 also has a second housing 25 having a second port 23 which is connected to a branch passage 15 from the passage 13, and a third port 24 which is always open to atmosphere. A third housing 28 of the body 20 has a fourth port 26 which is connected to a port 50 of an exhaust gas recirculation control valve means $V_2$ through a passage 16, and a fifth port 27 which is connected to a port upstream of the throttle valve 10 in its idling condition through a passage 17. The housings 22, 25 and 28 are sealingly secured to one another.

The diaphragm piston 30 includes a diaphragm member 31 the outer periphery of which is sealingly held by the housings 22 and 25, and a piston member including a pair of pressure plates 32 and 33 to thereby hold the inner periphery of the diaphragm member 31 and a rod 34 secured to the plate 33. The diaphragm piston 30 is downwardly biased by means of a spring 35 one end of which is seated against the plate 32. The biasing force of the spring 35 can be adjusted by means of a retainer 37 movable by means of thread means 36 threaded with the first housing 22. The inner periphery of the second diaphragm 39 is sealingly secured to the rod 34, and the outer periphery thereof is secured to an annular extension 25a of the second housing 25.

The valve means 40 includes a valve member 41 engageable with the lower end of the rod 34 extending through the second housing 25, a second spring 42 biasing the valve member 41 towards the rod 34, and seats 43 and 44 provided on the second and third housings 25 and 28, respectively. Thus the valve means 40 is movable between the first position in which the valve member 41 engages with the seat 44 and the second position in which the valve member 41 engages with the seat 43 so that the port 26 is selectively brought in communication with port 24 or port 27.

The diaphragm piston 30 and the second diaphragm 39 define three pneumatic chambers $R_1$, $R_2$ and $R_3$ within the body 20, the first chamber $R_1$ being in communication with the first port 21, the second chamber $R_2$ being in communication with the second port 23 and the third chamber $R_3$ being adapted in communication with the third, fourth and fifth ports 24, 26 and 27. Thus, the diaphragm piston 30 is movable in response to the difference in pressure between the chambers $R_1$ and $R_2$.

Figure 3:
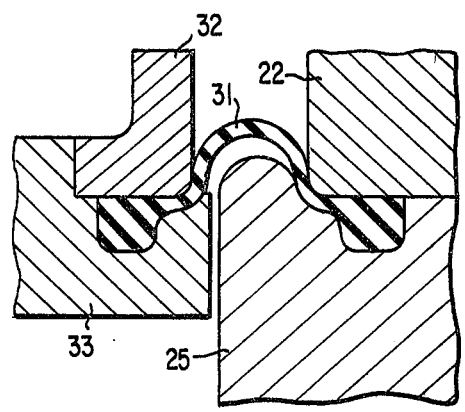
FIG. 3 is an enlarged cross-sectional view of a part of the pneumatic pressure valve assembly.

Referring now to FIG. 3, the diaphragm member 31 is formed and arranged so as to expand towards the chamber $R_1$. The lower plate 33 has an outer peripheral end expanding outwardly and upwardly along the configuration of the diaphragm member 31 when being shaped, while the inner and upper end of the second housing 25 is formed so as to expand inwardly and upwardly partly along the configuration of the diaphragm member 31 when being shaped. Thus, the diaphragm member 31 is prevented from turning over its concave curvature due to the above expanding portions of the plate 33 and the second housing 25 even when the chamber $R_1$ receives the fluid pressure which is higher than that within the chamber $R_2$.

Figure 4:
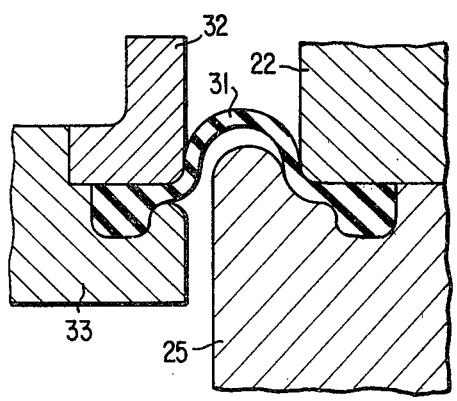
FIGS. 4 and 5 are views similar to FIG. 3, but illustrating modifications, respectively.
Figure 5:
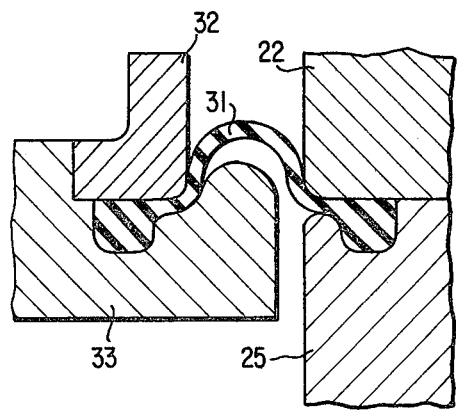

For the purpose of preventing the concave curvature of the diaphragm member 31 from turning over, only the inner and upper end of the second housing 25 may be expanded inwardly and upwardly, as shown in FIG. 4. Otherwise, only the outer peripheral end of the plate 33 may be expanded outwardly and upwardly, as shown in FIG. 5.

During the idling condition of the vehicle engine, the throttle valve 10 is in its position, as shown by the solid line in FIG. 1. Thus, the passage 13 receives vacuum pressure while the passage 17 is subjected to atmosphere. This means that both chambers $R_1$ and $R_2$ of the valve assembly $V_1$ receive vacuum pressures so that the diaphragm piston 30 is maintained and held in its illustrated position in FIG. 2 due to the biasing force of the spring 35. The valve member 41 now engages with the seat 44 and is spaced from the seat 43 to thereby complete the fluid communication between ports 26 and 24. As a result, chamber $R_4$ of the control valve means $V_2$ receives atmospheric pressure through means of passage 16 and port 50, and valve member 51 is urged in its closed position due to the biasing force of spring 52 so as to prevent fluid communication between passages 18 and 19. Thus, recirculation of exhaust gas from the exhaust manifold to the carburetor is prevented.

When the throttle valve 10 is rotated to its position, as shown by the imaginary line in FIG. 1, the passage 13 is subjected to atmosphere while the passage 17 receives vacuum pressure. The atmospheric pressure within the passage 13 is immediately transmitted to the chamber $R_2$ through means of passage 15 and the second port 23, but the transmission of atmospheric pressure from the passage 13 to the chamber $R_1$ through means of the first port 21 is delayed due to the arrangement of the orifice 14. Therefore, the difference in pressure between chambers $R_1$ and $R_2$ will arise for a predetermined time whereby the diaphragm piston 30 is caused to be moved towards the chamber $R_1$ against biasing force of the spring 35. The rod 34 is now spaced from the valve member 41 and the valve member 41 is brought in contact with the seat 43 due to the biasing force of the spring 42. As a result, the port 26 is brought in communication with the port 27, and vacuum pressure within the passage 17 is transmitted to the chamber $R_4$ of the control valve means $V_2$. The valve member 51 of the control valve means $V_2$ is moved against the biasing force of the spring 52 to thereby complete fluid communication between passages 18 and 19. Thus a part of the exhaust gas within the exhaust manifold may be recirculated. The recirculation of exhaust gas will be continued as far as the difference in pressure between the chambers $R_1$ and $R_2$ will overcome the biasing force of the spring 35. After the predetermined time will pass, the diaphragm piston 30 moves towards the chamber $R_2$ due to the spring 35, and the valve member 41 is moved so as to engage with seat 44. The fluid communication between ports 26 and 27 is interrupted, again, so that the valve member 51 of the control valve means $V_2$ is closed to thereby prevent recirculation of exhaust gas.

When the throttle valve 10 is returned from its position shown by the imaginary line in FIG. 1 to its position shown by the solid line in FIG. 1, the passage 13 receives vacuum pressure and the passage 17 is again subjected to atmospheric pressure. Vacuum pressure within the passage 13 is immediately transmitted to the second chamber $R_2$, but the transmission of vacuum pressure from the passage 13 to the chamber $R_1$ is delayed due to the arrangement of the orifice 14. Therefore, the difference in pressure between the chambers $R_1$ and $R_2$ will arise for a predetermined time, so that the above difference in pressure urges the diaphragm member 31 so as to cause its curvature to turn over. However, the expanding portions which are formed on the housing 25 and/or plate 33 prevent the diaphragm member 31 from turning over.

Obviously numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A pneumatic pressure responsive valve assembly comprising:
   a housing;
   diaphragm piston means including a diaphragm member and a piston member, said diaphragm member having an outer periphery secured to said housing and an inner periphery secured to said piston member;
   two pneumatic chambers defined by said diaphragm piston means within said housing, one of said chambers selectively receiving both fluid pressures which are higher and lower than those within the other of said chambers during operation of said valve assembly;
   said diaphragm member having a curvature which expands in a first direction towards one of said chambers;
   a rounded portion formed on said housing corresponding to a concave configuration of said curvature of said diaphragm member and spaced from said curvature of said diaphragm when said valve assembly is in an inoperative state to thereby prevent said curvature of said diaphragm member from turning over, said rounded portion being connected to said housing via an extension of said housing, said extension being curved toward said first direction and fixedly securing, in cooperation with an opposed portion of said housing, said outer periphery of said diaphragm member and orienting said outer periphery in said first direction; and
   a valve member for cooperation with movement of said piston member, wherein said piston member has an extension curved toward said first direction and fixedly securing, in cooperation with an opposed portion of said piston, said inner periphery of said diaphragm member and orienting said inner periphery in said first direction, and wherein the ends of said diaphragm are oriented in planes substantially perpendicular to a plane oriented in said first direction.

2. A pneumatic pressure responsive valve assembly comprising:
   a housing;
   diaphragm piston means including a diaphragm member and a piston member, said diaphragm member having an outer periphery secured to said housing and an inner periphery secured to said piston member;

two pneumatic chambers defined by said diaphragm piston means within said housing, one of said chambers selectively receiving both fluid pressures which are higher and lower than those within the other of said chambers during operation of said valve assembly;

said diaphragm member having a curvature which expands in a first direction towards one of said chambers;

a rounded portion formed on said piston corresponding to a concave configuration of said curvature of said diaphragm member and spaced from said curvature of said diaphragm when said valve assembly is in an inoperative state to thereby prevent said curvature of said diaphragm member from turning over, said rounded portion being connected to said piston via an extension of said piston, said extension being curved toward said first direction and fixedly securing, in cooperation with an opposed portion of said piston, said inner periphery of said diaphragm member and orienting said inner periphery in said first direction; and a valve member for cooperation with movement of said housing member, wherein said housing member has an extension curved toward said first direction and fixedly securing, in cooperation with an opposed portion of said housing, said outer periphery of said diaphragm member and orienting said outer periphery in said first direction, and wherein the ends of said diaphragm are oriented in planes substantially perpendicular to a plane oriented in said first direction.

* * * * *